US007278048B2

(12) United States Patent
Clark et al.

(10) Patent No.: US 7,278,048 B2
(45) Date of Patent: Oct. 2, 2007

(54) METHOD, SYSTEM AND COMPUTER PROGRAM PRODUCT FOR IMPROVING SYSTEM RELIABILITY

(75) Inventors: James C. Clark, De Kalb, IL (US); Daniel R. Jeske, Riverside, CA (US); Omar H. Salvador, Wheaton, IL (US); Kazem A. Sohraby, Fayetteville, AR (US); Xuemei Zhang, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 520 days.

(21) Appl. No.: 10/620,527

(22) Filed: Jul. 16, 2003

(65) Prior Publication Data

US 2005/0015683 A1 Jan. 20, 2005

(51) Int. Cl.
*G06F 11/00* (2006.01)
(52) U.S. Cl. .......................................... 714/1; 714/732
(58) Field of Classification Search .................. 714/1, 714/48, 41, 45, 732
See application file for complete search history.

(56) References Cited

U.S. PATENT DOCUMENTS 6,157,731 A * 12/2000 Hu et al. .................... 382/119
6,513,131 B1 * 1/2003 Kanekawa et al. ........... 714/11
2004/0057536 A1 * 3/2004 Kasper et al. .............. 375/343
2004/0219885 A1 * 11/2004 Sugar et al. ............. 455/67.11

* cited by examiner

*Primary Examiner*—Dieu-Minh Le

(57) ABSTRACT

A method and system for improving the reliability of a system, such as a software system, is disclosed. "Service measurements" that are routinely measured and monitored in connection with the operation of systems (e.g., QOS (Quality Of Service) measurements) are utilized in the reliability architecture of the system. Service measurements include a number of alternative data types, such as transactions completed, messages received, messages sent, calls completed, bytes transmitted, jobs processed, etc. Any operations of the system that are typically monitored for other purposes can be utilized in the reliability architecture of the present invention. Most systems track these types of statistics as, for example, part of their billing procedures or part of their performance bench-marking or QOS processes. Since these statistics are already kept, it is very simple to analyze the statistics to create the historical signatures, and then monitor the statistics of the currently operating system to perform the signature checking process.

30 Claims, 4 Drawing Sheets

METHOD, SYSTEM AND COMPUTER PROGRAM PRODUCT FOR IMPROVING SYSTEM RELIABILITY

TECHNICAL FIELD

The present invention relates to improvement of the reliability of systems with built-in redundancy, and more particularly, to a method and system for improving system reliability by reducing the time required to detect "silent failures."

BACKGROUND

The world today is inundated with systems that assist humans in almost every aspect of their lives. The term "system" is defined by Webster's as "a regularly interacting or interdependent group of items forming a unified whole." Security systems protect buildings from intruders; traffic control systems control the flow of traffic on roads and highways; navigation systems assist operators in navigation of something as simple as an automobile to something as complex as the space shuttle; price look-up systems help us move more quickly through a grocery store check-out line; computer systems frequently run all of the above-mentioned systems.

A prime example of systems requiring high degrees of reliability are telecommunications systems. Telecommunications switching and transmission systems consist of multiple processing elements, must support fast transport and signaling applications, and perform complex tasks such as protocol conversion and signaling. Due to the complexity of the tasks performed by such systems and the need for error-free communications, particularly at very high speeds, "almost perfect" availability is practically required. To achieve this high level of availability, it would be optimal to adopt in these systems methods and techniques that assure detection of silent failures before they occur, and based on trends that are available for a particular system. However, prior art detection schemes do not provide adequate measures for achieving this high level of system availability.

Because there is such a great reliance on the correct operation of systems in our daily lives, the traditional approach towards designing a highly reliable system (e.g., one that is available to operate 99.99% of the time) has been to build redundancy into the architecture and to design a sufficiently rich set of failure diagnostic tools so that the redundancy can be utilized to recover from simple failures. The benefit of redundancy is only realized, however, when the system is able to detect a failure in the system and successfully "promote" (put into operation) a redundant system element (referred to herein as a "Standby Unit" or "SU") to take the place of a failed primary system element (referred to herein as an "Active Unit" or "AU"). Systems employing this technique are sometimes referred to as "active-standby systems." An "active-active" system is similar, except that in an active-active system, there are two active units, each performing their own tasks, and upon failure of one of the active units, the other one takes on the tasks of the first one.

In practice, it is not possible to guarantee that failure diagnostic tools will detect 100% of all unit failures. The reality is that some failure modes cannot be detected without human observation, and the coverage of failure diagnostic tools will typically be somewhat less than 100%. The percentage of unit failures that are covered by system failure diagnostic tools is termed the "coverage factor". Coverage is a concept that applies to both hardware and software related failures.

Experience has shown that as a product evolves through multiple releases, coverage on the order of 95% can be achieved. However, coverage can be considerably lower in early releases of a product. A good example is the evolution of a software system and the software-related failures connected therewith. With software related failures, field experience with the product (e.g., actual use by consumers) is necessary to achieve high coverage. Failures that escape (i.e., are not identified by) system failure diagnostic tools are called "silent failures." Silent failures require human observation to be detected and human intervention to be corrected. Human observation can come in the form of routine system checks by conscientious technicians or, in the worst case, by customer complaints indicating that the system is not working. Human intervention can come in the form of sending a technician to a facility to investigate the system up close or in the form of software debugging by a programmer. The recovery duration from silent failures is therefore highly variable. When a system experiences a silent failure, prolonged down time can occur, and prolonged down time can translate to huge monetary and operational losses for both the system operators/sellers and for the users of the system.

It would be beneficial to reduce the time it takes to detect silent failures in systems of all kinds. However, prior art mechanisms for reducing the time required to detect silent failures are inadequate.

SUMMARY

In accordance with the present invention, operational characteristics of a system are identified during normal operations and data pertaining to these characteristics are gathered and stored. This creates a historical "signature" of the system when operating properly that is continuously or periodically compared with data pertaining to the current operation of the system. If the comparison of data indicates that the system as it is currently operating is not operating in accordance with the signature, an assumption is made that the system may be malfunctioning, and measures are instituted to analyze and/or remove from operation the system under analysis, and in a preferred embodiment, a standby unit is promoted to take over the operations performed by the potentially faulty unit.

In one embodiment, "service measurements" that are routinely measured and monitored in connection with the operation of systems (e.g., QOS (Quality Of Service) measurements) are utilized in the reliability architecture of the system. Service measurements include a number of alternative data types, such as transactions completed, messages received, messages sent, calls completed, bytes transmitted, jobs processed, etc. Any operations of the system that are typically monitored for other purposes can be utilized in the reliability architecture of the present invention. Most systems track these types of statistics as, for example, part of their billing procedures or part of their performance benchmarking or QOS processes. Since these statistics are already kept, it is very simple to analyze the statistics to create the historical signatures, and then monitor the statistics of the currently operating system to perform the signature checking process.

DETAILED DESCRIPTION

To understand the present invention, it is helpful to understand the basic operation of redundant systems generally. As an example, consider the model of an active-standby redundant software system illustrated in FIG. 1 by way of a state chart. This system is representative of similar models used for many different types of systems, both hardware and software. Straightforward modifications apparent to one of ordinary skill in the art can be made to the system illustrated in FIG. 1 to render it appropriate for active-active redundancy.

Figure 1:
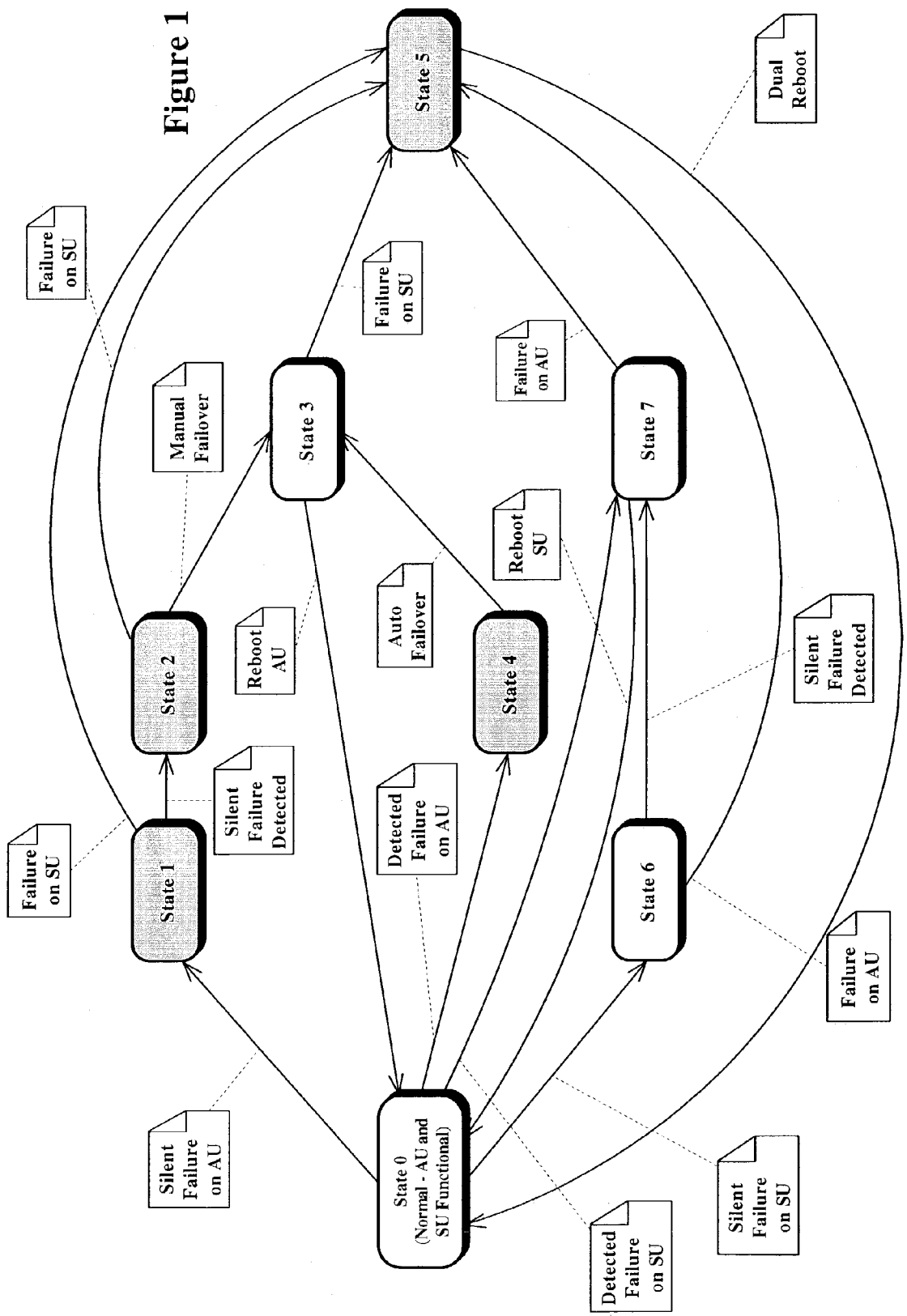
FIG. 1 is a state chart illustrating a simple example of an active-standby redundant software system.

FIG. 1 is a state chart illustrating a simple example of a redundant software system. In this example, assume that there is an AU that is the primary unit for conducting a processing operation and an SU that is a redundant standby unit that can be placed in operation to take over when the AU experiences a failure. Each of these units operates one or more software programs to perform a variety of functions, the details of which are not relevant for this discussion. The switch from use of the active unit to use of the standby unit is referred to herein as a "failover".

The shaded state boxes in FIG. 1 (States 1, 2, 4 and 5) indicate states during which the entire system is down. State 0 represents the normal state where both AU and the SU are functioning normally. There are two types of failures in this system. The first, referred to herein as a "detected failure" is one that is automatically detected by standard system failure diagnostic tools, which can be either hardware or software tools designed to detect a failure. Detected failures are typically detected and corrected almost instantaneously.

The second type of failure is referred to herein as a "silent failure" and comprises those types of failures that are not detected by standard system failure diagnostic tools. Silent failures are not identified until they have been detected by a human, i.e., at some point a human being is going to notice that a particular system or operation is not functioning properly and take steps to figure out what is wrong or alert those who can figure out what is wrong. A significant amount of time may elapse before such silent failures are detected.

Referring to FIG. 1, a transition from State 0 (normal) to State 4 (detected failure on AU) occurs when the software (in this example) on the AU fails and the failure is detected by system failure diagnostic tools. The entire system momentarily shuts down, as identified in FIG. 1 by the shading with respect to State 4. Upon entering State 4, an automatic failover occurs, immediately switching the system over to be operated by the SU, placing the system back in operation as indicated by State 3.

While in State 3, the faulty AU can be rebooted (if it is simply a software glitch, for example), replaced or repaired, and upon this occurrence, State 3 transitions back to State 0 for normal operation as indicated by the "reboot AU" transition line from State 3 back to State 0.

Alternatively, if while in State 3 (operating on SU) the SU also fails, then the state of operation proceeds to State 5, in which case the system is in a "duplex failure" where both the AU and SU are in a fail mode. This will require rebooting, repair or replacement of both AU and SU and the triggering of a dual reboot (identified by the transition arrow from State 5 to State 0).

A detected failure of the SU (while the AU is still functional) is illustrated by the transition from State 0 to State 7. Since the AU is still operational, at this point the system does not experience a down condition. The AU continues to run the system, and, if the SU can be rebooted, repaired or replaced, the state returns to State 0 as indicated by the transition line from State 7 back to State 0. However, if, while in State 7, a failure occurs on the AU, then the process transitions to State 5, which as discussed above, is a "duplex failure" situation.

Each of the above failure conditions illustrate detected failures, which require minimal human intervention and provide relatively stable reliability and essentially immediate switchover to a redundant system. However, the transitions from State 0 to State 1 and State 0 to State 6 illustrate the occurrence of silent failures. Referring first to the State 1 condition, the transition arrow from State 0 to State 1 illustrates the silent failure of the AU. Since the silent failure is not immediately detected, there is an initial down-time period for the entire system, illustrated by State 1, where there has been no detection of the failure. At some point, the silent failure is detected, as illustrated by the transition from State 1 to State 2. The time that elapses before the silent failure is detected could be a substantially long period of time resulting in significant problems for the operator of the system and the users of the system. It may be detected only after users complain about their inability to use the system, for example.

When the silent failure has been detected, the state of the active unit, and hence the entire system, remains in the down condition, until a human operator has the opportunity to perform a manual failover as illustrated by the transition line from State 2 to State 3. This involves the operator manually switching to the SU (for example, by entering a command at a control console connected to the system, instructing the SU to go into active mode). Once in State 3, the system comes back up and remains operational as described above.

When the silent failure occurs on the AU and the system is in State 1, if a failure then occurs on the SU (as identified by the transition line from State 1 to State 5), the entire system is down until the dual reboot described above can be performed. Similarly, if the SU fails during the manual failover illustrated by State 2, the entire system is down until the dual reboot can be performed (see transmitting from State 2 to State 5).

Similarly, if there is a silent failure of the SU as illustrated by the transition line from State 0 to State 6, the system remains operational (since the AU is still operational), and when the silent failure of the SU is detected (illustrated by the transition line from State 6 to State 7), the system operates as described above with respect to State 7. However, when the system is operating on the AU with the SU in a failed state, there is no redundancy available, leaving the system in a precarious position.

Figure 2:
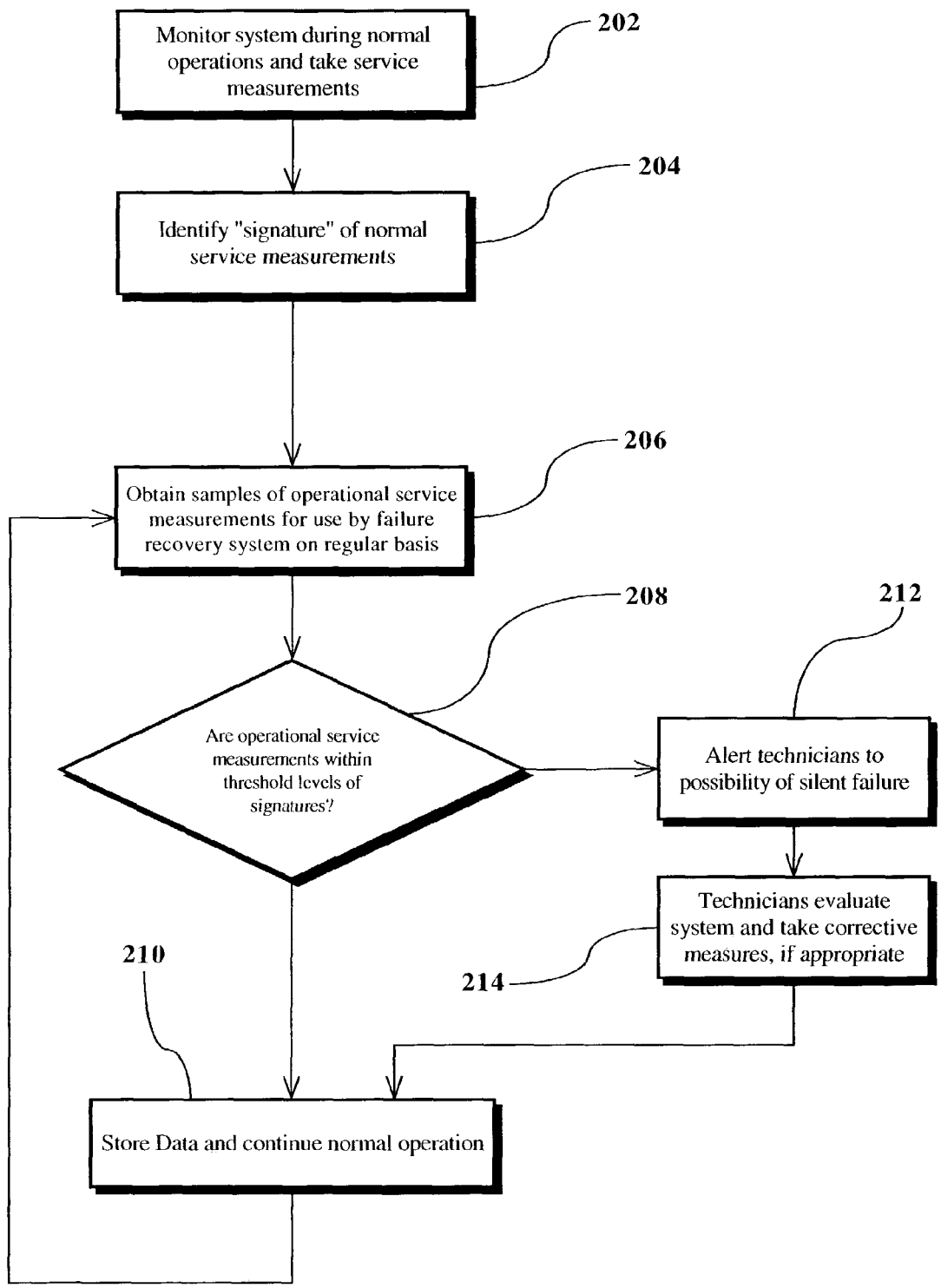
FIG. 2 is a flow chart illustrating the operation of a first method in accordance with the present invention.

The goal, therefore, is to reduce the time it takes to detect the silent failure. FIG. 2 is a flowchart illustrating the operation of the method of the present invention according to a first embodiment. Referring to FIG. 2, at step 202, the system is monitored, before being put online for normal operations, to store service measurements as they exist when the system is functioning properly. This monitoring period is referred to herein as the "indexing period" because the measurements (referred to herein as "index service measurements") taken during this time period are used to establish index values that are compared with measurements when the system is being used for its designed function (referred to herein as the "operational period").

The types of measurements being taken and monitored is limited only by the particulars of the monitored system. For example, in a telecommunications system, the number of call requests successfully processed might be monitored. In a banking system, the number of bank transactions successfully processed might be monitored. Both of those are examples of the monitoring of successful service requests processed. If varying modes of operation are possible by the system, then measurements are taken for each mode. It is understood that while FIG. 2 (and FIG. 3, below) illustrate the indexing period as occurring when the system is offline, it may also occur when the system is online and functioning normally. If desired, the signature could be initialized to default values, and update the default values gradually as online data is processed.

At step 204, signatures are identified with respect to the index service measurements. In other words, historical benchmark values are established for the index service measurements and stored as the "signature" that will identify the occurrence of normal operations. A representative output of step 204 might be, for example, a probability distribution for the value of a particular service measurement over a specified period of time.

At step 206, samples of current operational service measurements are obtained and delivered to the failure recovery system, where the signatures are stored. This occurs on a periodic and regular basis so that the system is being monitored at all times. If desired, the flow of sample operational service measurements to the failure recovery system can be continuous rather than in periodic samples.

At step 208, a determination is made as to whether or not the current operational service measurements are within the threshold levels of the signatures. This can be done in many known ways using standard comparison algorithms run by a computer processor as is well known. An example implementation of step 208 is to compute the probability of observing a service measurement more extreme than the current observation, using the aforementioned baseline probability distribution. A small probability can be taken as indicating that the current operational service measurement is outside the established signature thresholds. If, at step 208, it is determined that the measurements are within the threshold levels of the signatures, then the process proceeds to step 210, where the data samples are stored to update the signatures, thereby increasing the accuracy of the signatures. Of course, step 210 is optional and if desired, can be skipped all together. After step 210, the process proceeds back to step 206 where more samples are sent to the failure recovery system and analyzed at step 208.

If, at step 208, it is determined that the operational service measurements are outside of the threshold levels of the signatures, then the process proceeds to step 212, where technicians are alerted to the possibility of the occurrence of a silent failure. This can be done with beepers, cellular phones, a broadcast email message, or indication on a monitoring console, etc. Upon receiving the alert, at step 214, the technicians evaluate the system and take corrective measures if appropriate. The process then proceeds back to step 210 where, if desired, the data is stored. For example, if desired, a signature of a silent failure can be stored so that, in the event of a similar occurrence at a later date, the technicians may have a better idea when conducting their analysis as to what portion of the system is experiencing problems. The process then proceeds back to step 206 and continues, as discussed above.

Figure 3:
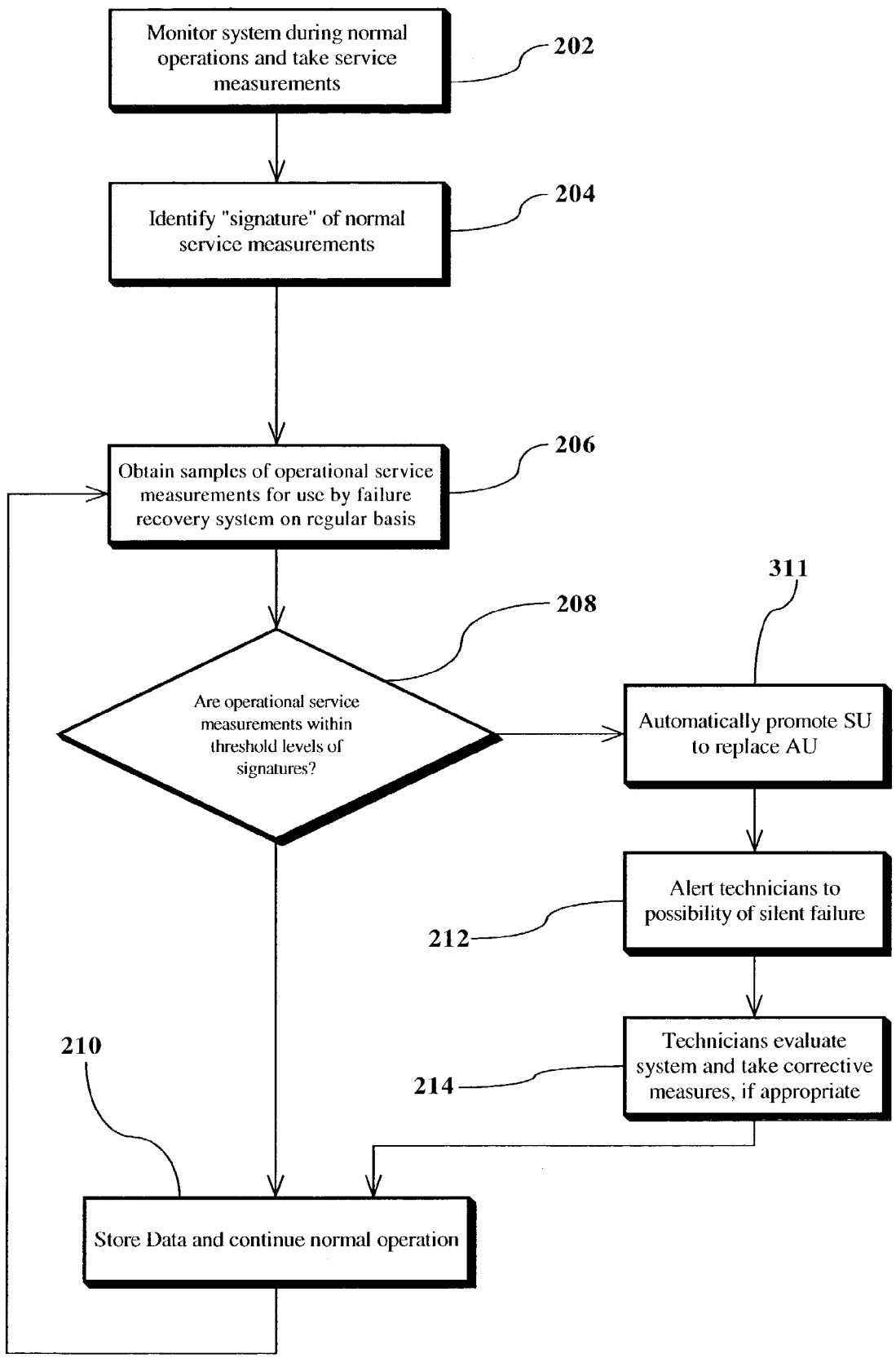
FIG. 3 is a flow chart illustrating the operation of a second method in accordance with the present invention.

FIG. 3 illustrates an alternative embodiment that is more operationally aggressive than the embodiment illustrated in FIG. 2. The process is essentially identical to that of FIG. 2 except that, at step 208, when it is determined that the operational service measurements are not within the threshold levels of the signature, the process proceeds to step 311 where the SU is automatically promoted to replace the unit believed to be faulty as a result of the measurement being outside of the threshold. Once the SU has taken over, steps can be taken to reboot, repair, or replace the faulty AU. For example, if desired, steps 212 and 214 can be performed. At step 212, as in FIG. 2, the technicians are alerted to the possibility of a silent failure and at step 214 the technicians evaluate the system and take corrective measures where appropriate. This implementation shortens further the recovery duration by removing the technician completely from the recovery process. In cases where there was not a silent failure, the promotion that accompanies the more aggressive implementation of this feature would in hindsight be seen to have been unnecessary. However, assuming, as is typically the case, that the promotion to the SU has a minor effect on the service and has a small probability of failing, the advantage of further shortening the recovery duration is compelling.

The comparison step 208 can be performed using any known method for comparing a sample with a signature. For example hypothesis testing or change-point detection can be used for this comparing process. With hypothesis testing, for example, a distribution F for one or more metrics cans obtained from the indexing-period data. Then the hypothesis will be that the operational measurements come from F. Classical approaches such as goodness-of-fit statistics, nonparametric statistics, likelihood ratio tests and Bayesian analysis can be used to test the hypothesis, to name a few.

If change-point detection is used, the operational measurements are monitored and a flag is raised when current data differs significantly from historical data. Methods that can be used in change-point detection case include the classic quality control charts that are prevalent in manufacturing industries. Examples of quality control charts include Shewhart charts, geometric moving average charts, finite moving average control charts, filtered derivative algorithms, and cumulative sum algorithms.

Figure 4:
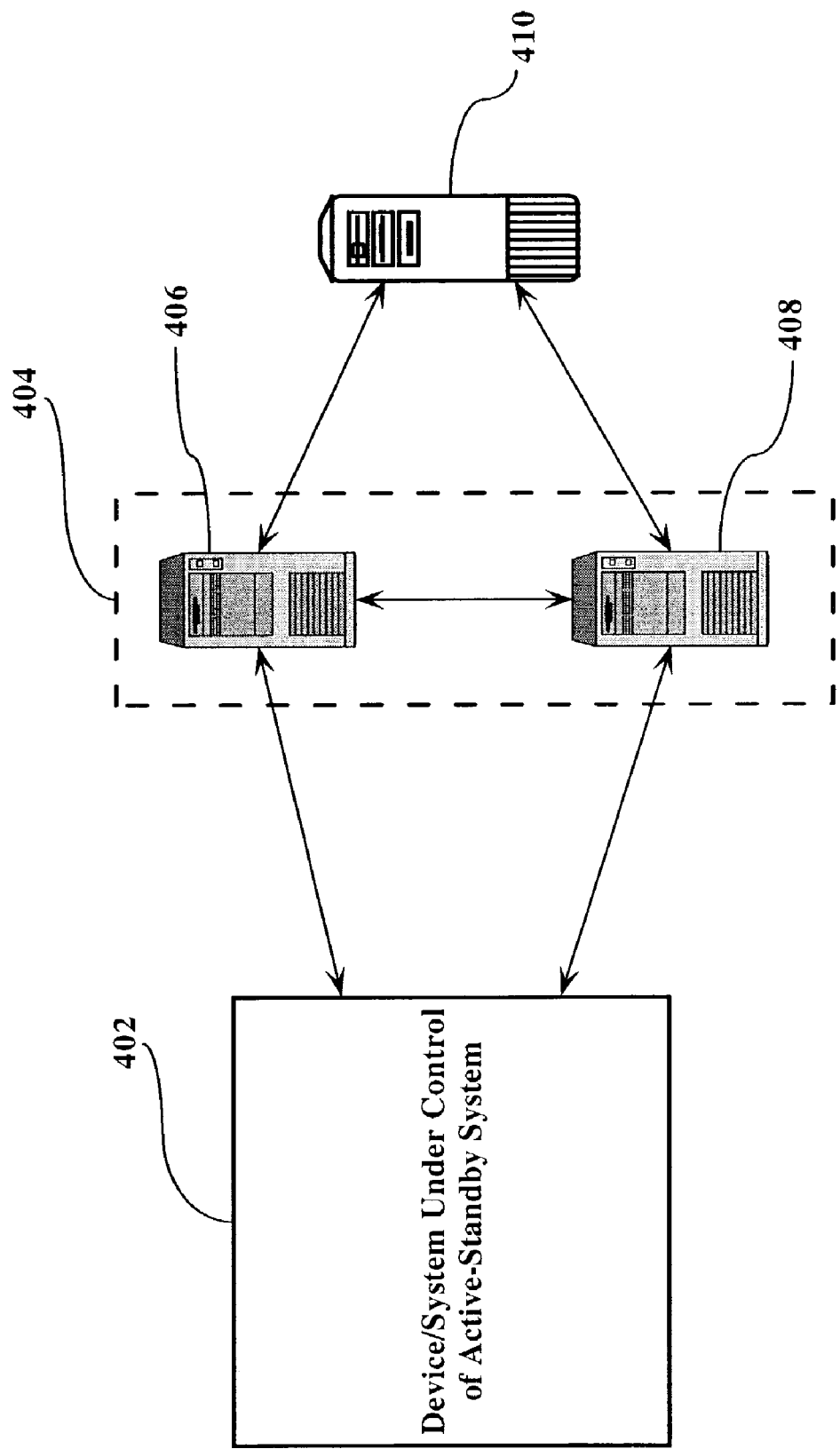
FIG. 4 is a block diagram illustrating an example of a simple hardware implementation of a failsafe system in accordance with the present invention.

FIG. 4 is a block diagram illustrating an example of a simple hardware implementation of a failsafe system in accordance with the present invention. Referring to FIG. 4, block 402 represents a device or system that is under control of the redundant system of the present invention. An active-standby system 404 includes server 406 coupled to the device/system 402 for operational control thereof. Server 406 represents an Active Unit (AU) as discussed above with respect to FIGS. 1-3. A second server 408 represents a Standby Unit (SU). If the present system were an active-active system, then server 408 would be the second Active Unit in the system.

As an active-standby system, server 406 controls the operations of device/system 402 under normal circumstances. Failure detection system 410 is coupled to active-standby system 404 to monitor the operations thereof. Further, in accordance with the present invention, failure detection system 410 also obtains the service measurements (index and operational) and determine if they are within the threshold levels of the signatures for servers 406 and 408. If desired, failure detection system 410 can also be configured in a well known manner to perform communication operations, e.g., sending of emails, automatically dialing pager systems or cell phones, etc., to notify technicians of the possibility of a silent failure. As discussed above, if the samples obtained by failure detection system 410 indicate the occurrence of a silent failure, an alternate unit is automatically promoted and, if necessary, technicians are alerted.

The hardware elements illustrated in FIG. 4 can comprise conventional elements; for example, server 406 and server 408 can each comprise standard PC's, servers, or the like. Likewise, the device/system 402 can comprise any system that requires monitoring and has access to redundant systems such as servers 406 and 408. Failure detection system 410 can comprise a server or PC configured with, for example, software that performs the monitoring and analysis functions using known processes.

As noted above, telecommunications systems have particularly stringent requirements for continuous operation without failure (or at least minimal downtime due to system failures) and thus the present invention is particularly applicable in telecommunications systems. Existing "heartbeat" monitoring mechanisms are effective in detecting total failures, but do not detect failures of components that are active but failing to properly perform their functions. For example, a Call Server may be running (active) but the call processing that it is supposed to be performing is failing. By monitoring, for example, the number of Call Requests and the number of successful call requests, a Call Server signature can be established in accordance with the present invention to be used to monitor the Call Server of a telecommunications system. Short Messaging functions can be monitored by monitoring SMS messages received and SMS messages successfully sent; mobility functions can be monitored by monitoring attempted handovers, successful handovers, paging requests, location update requests, and successful location updates; signaling functions can be monitored by monitoring connection requests and successful connection requests. These are just a few examples of the many systems in a telecommunications system that can be monitored using the techniques described herein, and numerous other telecommunications examples will be readily apparent to one of ordinary skill in the art, and it is intended that such example are included in this specification and covered by the appended claims.

The above-described steps can be implemented using standard well-known programming techniques. The novelty of the above-described embodiment lies not in the specific programming techniques but in the use of the steps described to achieve the described results. Software programming code that embodies the present invention is typically stored in permanent storage of some type, such as permanent storage of a workstation located where the system being monitored is located. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-4 support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention that fall within the true spirit and scope of the invention.

What is claimed is:

1. A method for detecting silent failures in a system, comprising the steps of:

identifying an operational signature of said system, said operational signature being representative of the system when it is operating properly;

obtaining samples of operational service measurements;

comparing said samples with said operational signature; and performing a corrective measure if said comparison of said samples with said operational signature indicates the probability of a silent failure of said system.

2. The method of claim 1, wherein said system comprises a processing system having at least one Active Unit (AU) and at least one Standby Unit (SU), and wherein said step of performing a corrective measure comprises at least the steps of:

automatically activating said at least one SU if said comparison indicates that a silent failure has occurred with respect to said at least one AU.

3. The method of claim 2, wherein said step of performing said corrective measure further comprises at least the step of:

automatically initiating an alert indicating that a silent failure of said system is probable.

4. The method of claim 3, wherein said alert process comprises automatically communicating with a technician electronically.

5. The method of claim 1, wherein said identifying step comprises at least the steps of:

monitoring said system during an index period to obtain a set of index service measurements;

evaluating said index service measurements and determining said operational signature based on said index service measurements.

6. The method of claim 5, wherein said identifying step is instituted during a period when said system is actively online.

7. The method of claim 5, wherein said identifying step is instituted during a period when said system is not actively online.

8. The method of claim 7, wherein said index service measurements are updated at predetermined times to incorporate said operational service measurements therein.

9. The method of claim 1, wherein said system comprises a telecommunications system that includes a call processing function, said operational characteristics comprising:
   call requests; and
   successful call requests.

10. The method of claim 1, wherein said system comprises a telecommunications system that includes a mobility function, said operational characteristics comprising:
    attempted handovers;
    successful handovers; and
    paging requests.

11. A system for detecting silent failures in a system, comprising:
    means for identifying an operational signature of said system, said operational signature being representative of the system when it is operating properly;
    means for obtaining samples of operational service measurements;
    means for comparing said samples with said operational signature; and
    means for performing a corrective measure if said comparison of said samples with said operational signature indicates the probability of a silent failure of said system.

12. The system of claim 11, wherein said system comprises a processing system having at least one Active Unit (AU) and at least one Standby Unit (SU), and wherein said means of performing a corrective measure comprises:
    means for automatically activating said at least one SU if said comparison indicates that a silent failure has occurred with respect to said at least one AU.

13. The system of claim 12, wherein said means of performing said corrective measure further comprises:
    means for automatically initiating an alert indicating that a silent failure of said system is probable.

14. The system of claim 13, wherein said alert process comprises means for automatically communicating with a technician electronically.

15. The system of claim 11, wherein said identifying means comprises:
    means for monitoring said system during an index period to obtain a set of index service measurements;
    means for evaluating said index service measurements and determining said operational signature based on said index service measurements.

16. The system of claim 15, wherein said identifying means is instituted during a period when said system is actively online.

17. The system of claim 15, wherein said identifying means is instituted during a period when said system is not actively online.

18. The system of claim 17, wherein said index service measurements are updated at predetermined times to incorporate said operational service measurements therein.

19. The system of claim 11, wherein said comparing means is performed using hypothesis testing.

20. The system of claim 11, wherein said comparison means is performed using change-point detection.

21. A machine-readable medium having stored thereon data representing sequences of instructions, the sequences of instructions which, when executed by a machine, cause the machine to perform detection of silent failures in a system using subsets of instructions, comprising:
    a first subset of instructions for identifying an operational signature of said system, said operational signature being representative of the system when it is operating properly;
    a second subset of instructions for obtaining samples of operational service measurements;
    a third subset of instructions for comparing said samples with said operational signature; and
    a fourth subset of instructions for performing a corrective measure if said comparison of said samples with said operational signature indicates the probability of a silent failure of said system.

22. The machine-readable medium of claim 21, wherein said machine-readable medium comprises a processing system having at least one Active Unit (AU) and at least one Standby Unit (SU), and wherein said fourth subset of instructions comprises:
    a fifth subset of instructions for automatically activating said at least one SU if said comparison indicates that a silent failure has occurred with respect to said at least one AU.

23. The machine-readable medium of claim 22, wherein said fourth subset of instructions further comprises:
    a sixth subset of instructions for automatically initiating an alert indicating that a silent failure of said system is probable.

24. The machine-readable medium of claim 23, wherein said sixth subset of instructions comprises a seventh subset of instructions for automatically communicating with a technician electronically.

25. The machine-readable medium of claim 21, wherein said first subset of instructions comprises:
    a fifth subset of instructions for monitoring said system during an index period to obtain a set of index service measurements;
    a sixth subset of instructions for evaluating said index service measurements and determining said operational signature based on said index service measurements.

26. The machine-readable medium of claim 25, wherein said first subset of instructions is instituted during a period when said system is actively online.

27. The machine-readable medium of claim 25, wherein said first subset of instructions is instituted during a period when said system is not actively online.

28. The machine-readable medium of claim 27, wherein said index service measurements are updated at predetermined times to incorporate said operational service measurements therein.

29. The machine-readable medium of claim 21, wherein said third subset of instructions is performed using hypothesis testing.

30. The machine-readable medium of claim 21, wherein said third subset of instructions is performed using change-point detection.

* * * * *